United States Patent [19]

Okano et al.

[11] 3,945,463
[45] Mar. 23, 1976

[54] LUBRICATION SYSTEM FOR MOTORCYCLES

[75] Inventors: Ryozo Okano, Iwata; Nobuyoshi Tominaga, Hamamatsu, both of Japan

[73] Assignee: Yamaha Hatsudoki Kabushiki Kaisha, Shizuoka, Japan

[22] Filed: July 25, 1975

[21] Appl. No.: 598,757

[30] Foreign Application Priority Data

July 27, 1974 Japan.............................. 49-86425
July 31, 1974 Japan.............................. 49-87639
Aug. 1, 1974 Japan.............................. 49-88490

[52] U.S. Cl.................... 184/6.13; 180/35; 184/7 R
[51] Int. Cl.²......................................... F16N 7/14
[58] Field of Search.......... 180/35; 184/6, 6.13, 6.5, 184/6.8, 6.9, 6.24, 7 R, 8; 280/281, 282; 123/196 R, 196 A

[56] References Cited
UNITED STATES PATENTS

| | | | |
|---|---|---|---|
| 1,125,442 | 1/1915 | Baker..................................... | 180/35 |
| 1,386,354 | 8/1921 | Owen..................................... | 180/35 |
| 1,797,722 | 3/1931 | Franklin................................ | 180/35 |

*Primary Examiner*—Richard C. Pinkham
*Assistant Examiner*—Marvin Siskind
*Attorney, Agent, or Firm*—Flynn & Frishauf

[57] ABSTRACT

A dry-sump type lubrication system for motorcycles which comprises an oil tank defined by the internal spaces of a main pipe, down tube, and tension pipe, and wherein the upper end of the down tube communicates with the forward end portion of the main pipe; the tension pipe communicates with the main pipe behind the junction of the main pipe and down tube, and also with the down tube below said junction; and lubricating oil is supplied to the engine from the lower end of the down tube.

13 Claims, 10 Drawing Figures

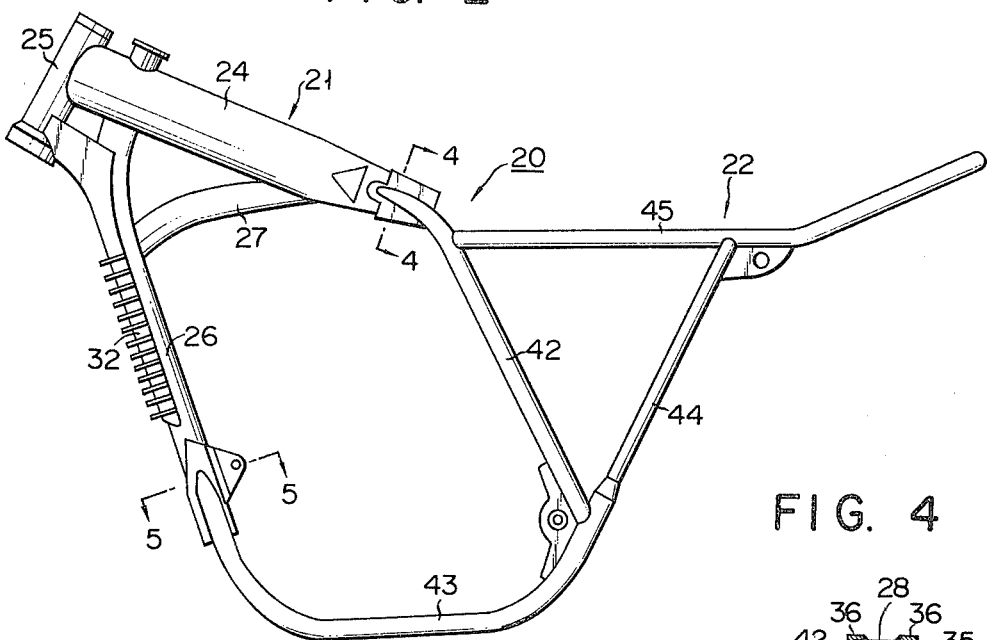
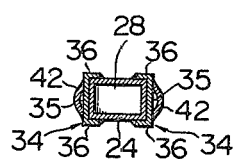
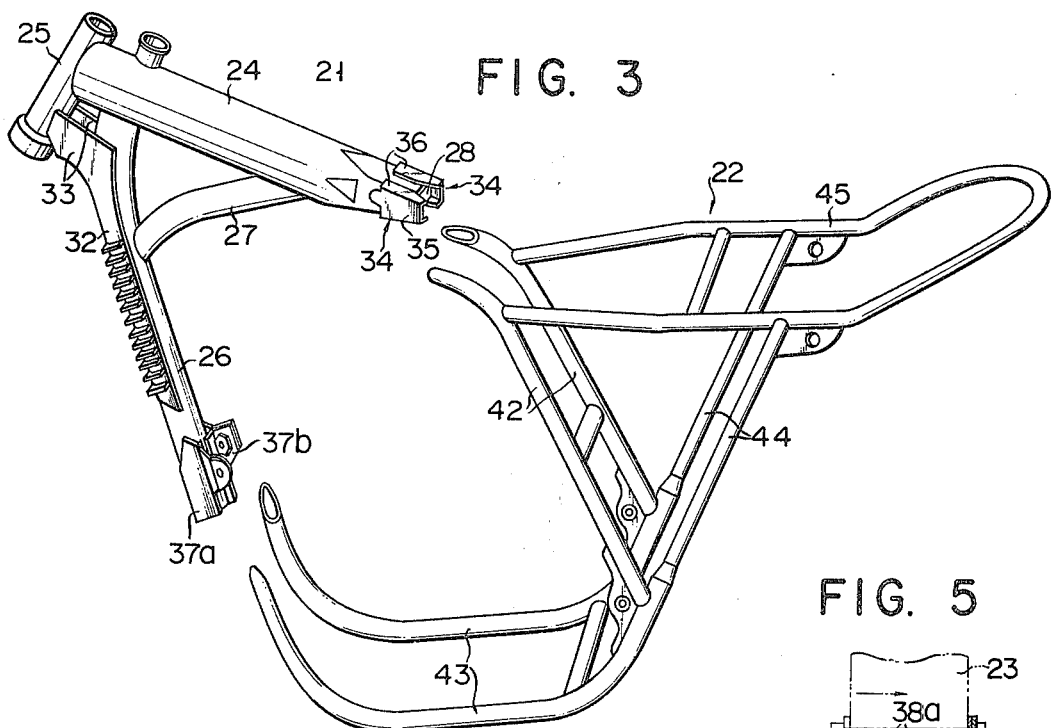
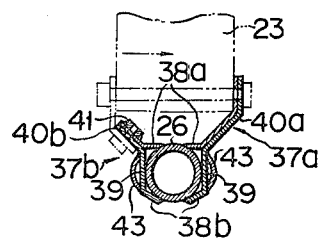

LUBRICATION SYSTEM FOR MOTORCYCLES

BACKGROUND OF THE INVENTION

This invention relates to a lubrication system for motorcycles, and more particularly to a dry-sump type lubrication system wherein the forward half section of the frame unit of a motorcycle is concurrently used as a lubrication oil tank.

The oil tank of the prior art lubrication system is defined by the internal spaces of the mutually connected main pipe, down tube, and tension pipe constituting the forward half section of the frame unit. Since, however, the upper end of the down tube is closed by being connected to the steering head pipe, air remains in the upper end region of the down tube when lubrication oil is brought into the oil tank through an inlet, reducing the oil capacity of the tank. Air bubbles contained in the lubrication oil held in the down tube increase the volume of air remaining in the upper end region of the down tube to obstruct the supply of lubrication oil to the engine. Further, air is conducted together with lubrication oil to those parts of the engine which have to be lubricated, often causing said part to be short of an oil film, and consequently giving rise to the wear and seizure of said oilless parts.

The prior art lubrication system wherein a breather intended to compensate for fluctuations in the air capacity of the lubrication oil tank is open to the atmosphere has various disadvantages that lubrication oil evaporates to the outside through the breather to be quickly depleted; when a motorcycle is thrown down, lubrication oil flows out of the breather; and dirt and dust are carried into the lubrication oil tank through the breather to accelerate the contamination of lubrication oil. Since the rear half section of the frame unit is directly welded to the forward half section thereof which is concurrently used as a lubrication oil tank, leakage, if any, of lubrication oil from said tank has to be examined only after the whole frame unit is fully constructed, rendering said examination considerably difficult due to the bulkiness of the frame unit thus constructed.

SUMMARY OF THE INVENTION

It is accordingly an object of this invention to provide a lubrication system for motorcycles wherein a lubrication oil tank is defined by the free space of part of a frame unit, and which enables the lubrication oil tank to be used as a reservoir of lubrication oil up to the full capacity and moreover eliminates the drawbacks accompanying the prior art lubrication system which resulted from the unavoidable inclusion of air in the lubrication oil tank as well as in lubrication oil itself.

Another object of the invention is to provide an improved lubrication system which further comprises such a breather as can prevent not only oil from leaking to the outside but also dirt and dust from being carried into the lubrication oil held in the lubrication oil tank.

Still another object of the invention is to provide an improved lubrication system which enables leakage, if any, of lubrication oil from the lubrication oil tank to be easily examined at low cost.

BRIEF DESCRIPTION OF THE DRAWING

FIG. 2 is a side view of a frame unit used with the lubrication system of the invention;

FIG. 3 is an oblique view of the forward and rear half sections of the frame unit of the invention before coupled together;

FIGS. 4 and 5 are sectional views on lines 4-4 and 5-5 of FIG. 2;

DETAILED DESCRIPTION OF THE INVENTION

Figure 1:
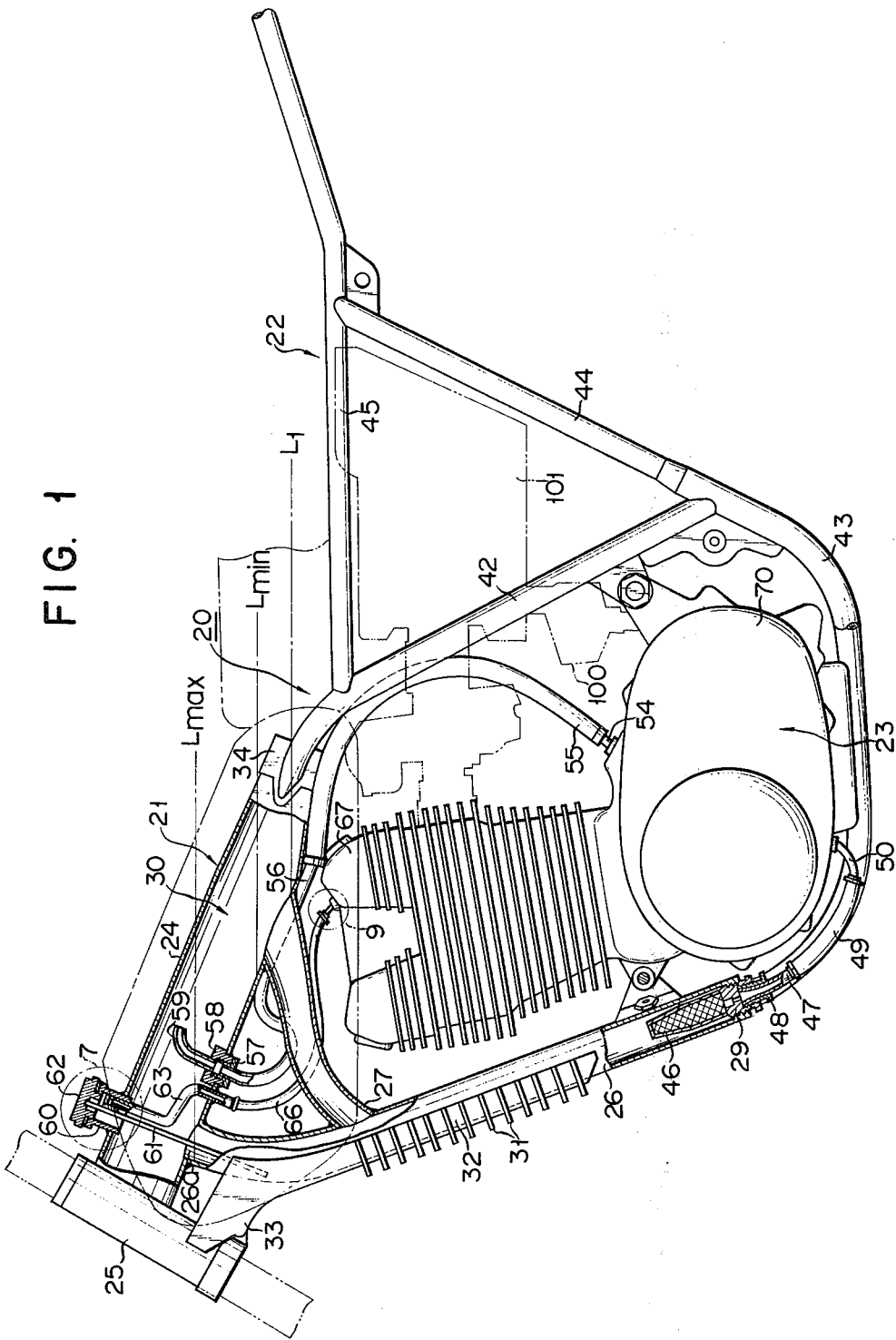
FIG. 1 is a fractional side view, partly in section, of a motorcycle equipped with a lubrication system according to an embodiment of this invention.

A motorcycle shown in FIG. 1 comprises a frame unit 20 consisting of a forward half section 21 and a rear half section 22 and an engine housing 23 fixed to the frame unit 20. As used herein, the term "engine housing" is defined to mean a container for holding mainly a 4-cycle internal combustion engine, cam mechanism, crank and transmission menas. The internal space of the engine housing 23 is connected, as is well known, to an air cleaner 101 through an engine breather 100. The other parts of the motorcycle are of known construction and are not related to this invention, illustration thereof being omitted. The forward half section 21 of the frame unit 20 includes a relatively thick main pipe 24 having its forward end welded in liquid tightness to a steering head pipe 25 and extending downward to the rear side, a down tube 26 welded to the forward underside of the main pipe 24 and extending sharply downward to the rear side and a tension pipe 27 connecting the rear underside of the main pipe 24 and the intermediate part of the down tube 26 and extending downward to the forward side. A seal cap 28 (FIGS. 3 and 4) is welded to the rear end opening of the main pipe 24 hermetically to seal it. The lower end opening of the down tube 26 is sealed by the later described plug 29 which is threadedly fitted thereinto. The internal spaces of the mutually communicating main pipe 24, down tube 26 and tension pipe 27 jointly define a lubrication oil tank 30. The tension pipe 27 is connected to the main pipe 24 at such a point that the capacity of the main pipe 24 below a horizontal line $L_1$ including the lowermost part of the junction of the tension pipe 27 and main pipe 24 accounts for less than 5% of the total capacity of the main pipe 24 when the motorcycle makes a normal run. The down tube 26 is provided with a plate 32 bearing a plurality of cooling fins 31. The cooling fins 31 not only cool the lubrication oil flowing through the down tube 26, but also protect the down tube from damage. The upper end portion of the plate 32 branches into two parts to form a pair of brackets 33, which are welded to the steering head pipe 25 so as to reinforce connection between the main pipe 24 and steering head pipe 25.

Though the down tube 26 is directly connected to the main pipe 24 in this embodiment, it may be connected to the steering head pipe 25 and indirectly communicate with the main pipe 24 through a subpipe (not shown) at a point above the junction of the down tube 26 and tension pipe 27, or preferably at the uppermost part of the down tube 26.

The rear end portion of the main pipe 24 is worked by press to have a rectangular cross section. Both lateral sides of said rear end portion are fitted with a pair of brackets 34 of the same shape and size. As shown in FIGS. 3 and 4, each bracket 34 has a plain surface 35 abutting against the corresponding side wall of the rectangular rear end portion of the main pipe 24. The upper and lower mutually facing folded portions 36 of the bracket 34 which extend along both lengthwise edges of said plain surface 35 are welded to the upper and lower walls of the rectangular rear end portion of the main pipe 24. As seen from FIGS. 2, 3 and 5, both lower end sides of the down tube 26 are fitted with a pair of brackets 37a, 37b. One bracket 37a consists of a plain surface 39 welded to the down tube 26 through folded portions 38a, 38b and an engine support 40a extending from said plain surface 39. The other bracket 37b is constructed in substantially the same manner as the first mentioned bracket 37a, excepting that the engine support 40b lacks an extending end portion but instead is provided with a welded nut 41. The reason why both brackets 37a, 37b are of different construction is that the bracket 37b should not obstruct the insertion of the engine housing 23 in the direction of the indicated arrow (FIG. 5).

The rear half section 22 of the frame unit 20 includes a pair of parallel seat pillar tubes 42 inclining sharply downward to the rear side, a pair of parallel under tubes 43 welded to the lower ends of the seat pillar tubes 42 with the forward ends of said under tubes 43 turned obliquely upward, a pair of parallel backstays 44 extending from the rear ends of the under tubes 43 obliquely upward to the rear side, and an almost horizontal U-shaped seat rail 45 welded to the above-mentioned pillar tubes 42 and backstays 44. The forward ends of the seat pillar tubes 42 and under tubes 43 are cut obliquely as illustrated in FIGS. 2 and 3. Where the frame unit 20 is constructed, the members of the forward half section of the frame unit 20 are first welded together, and then the brackets 34 are welded to the rear end of the main pipe 24 and the brackets 37a, 37b are welded to the lower end of the down tube 26. The seal cap 28 is welded to the rear end opening of the main pipe 24. A provisional seal member (not shown) is threadedly fitted into the lower end opening of the down tube 26. At this point, the forward half section 21 of the frame unit 20 is tested for leakage of lubrication oil. Since said forward half section 21 has a small size relative to the whole frame unit 20, the test for leakage of lubrication oil is easily carried out, making it unnecessary to use a large scale tester. When the test proves that lubrication oil does not leak at all, the obliquely cut end portions of the seat pillar tubes 42 and those of the under tubes 43 of the rear half section 22 of the frame unit 20 are welded to the plain surfaces 35, 39 of the brackets 34, and 37a, 37b respectively. Thus the frame unit 20 is firmly constructed as shown in FIGS. 4 and 5. Since the rear half section 22 of the frame unit 20 is not directly welded to the forward half section thereof, but is welded to the brackets 34, 37a, 37b, the liquid tightness of the oil tank 30 defined by the forward half section 21 of the frame unit 20 is not obstructed. The aforesaid provisional seal member is then taken off the down tube 26, and the plug 29 is threadedly fitted into the down tube 26.

The tubular plug 29 threadedly fitted into the lower end of the down tube 26 has a cylindrical strainer which is formed of, for example, wire netting and extends into the down tube 26 from the inner end of the plug 29. A support 48 for holding a metal pipe 47 is threadedly fitted into the outer end portion of the plug 29. A lubrication oil supply pipe 49 made of flexible material, for example, synthetic rubber is connected to the metal pipe 47. The rear end of the lubrication oil supply pipe 49 is connected to a metal pipe 50 fitted to the engine housing 23.

Figure 6:
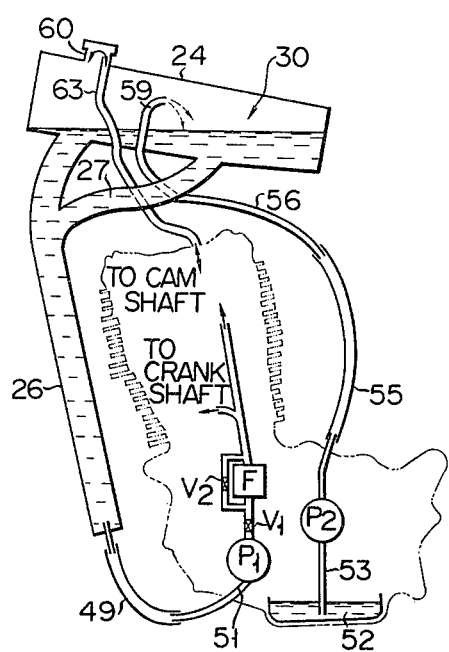
FIG. 6 schematically shows the passageway through which lubrication oil flows.

As schematically illustrated in FIG. 6, the metal pipe 50 is connected to a lubrication oil passageway 51, which conducts lubrication oil to the cam shaft and crank shaft of the engine through a feed pump P, for example, of the trochoid type, counter balance valves $V_1$, $V_2$ and filter F. After lubricating these cam shaft and crank shaft, the lubrication oil flows through various gaps in the engine housing 23 to be collected in a pan 52. The lubrication oil thus collected is delivered to a lubrication oil return passageway 53 by a scavenge pump $P_2$ and then from said return passageway 53 to a metal pipe 54 (FIG. 1) fixed to the engine housing 23. The above-mentioned internal arrangement of the engine housing 23 is already known and is not related to the object of this invention, any further description thereof being omitted.

As shown in FIG. 1, a lubrication oil return tube 55 made of flexible material such as synthetic rubber is connected at one end to the outer end of the metal pipe 54, and at the other end to a metal pipe 56. A member 57 fixed to the other end of the last mentioned metal pipe 56 is further threadedly inserted into a block 58 welded to the underside of the main pipe 24 at a point apart from the junction 26a of the main pipe 24 and down tube 26. A curved metal outlet pipe 59 is fitted to the inner end of the block 58. The opening of said outlet pipe 59 is positioned in a direction departing from the junction 26a.

Figure 7:
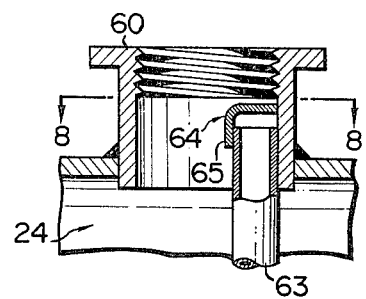
FIG. 7 is an enlarged view of the section of FIG. 1 enclosed in a circle 7, showing a filler neck fitted with a breather pipe, though a tank cap is omitted.
Figure 8:
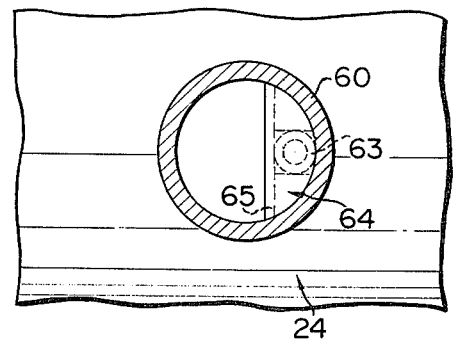
FIG. 8 is a sectional view on line 8—8 of FIG. 7.
Figure 9:
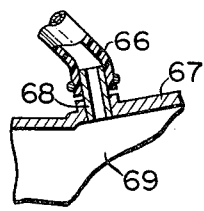
FIG. 9 is an enlarged sectional view of the part of FIG. 1 endosed in a circle 9, indicating the junction of the breather pipe and engine housing.
Figure 10:
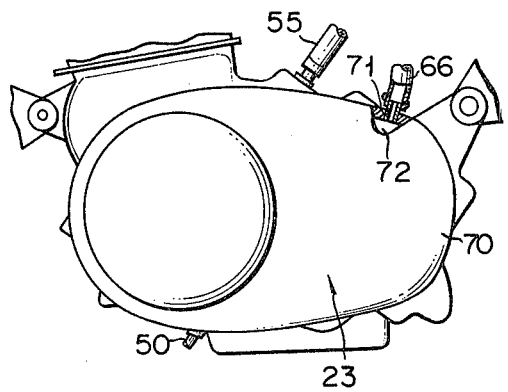
FIG. 10 presents a modification of the junction of the breather pipe and engine housing.

As shown in FIGS. 1, 7 and 8, a filler neck 60 is welded to the forward upper part of the main pipe 24. A tank cap 62 provided with a level gauge 61 is threadedly fitted into the filler neck 60. Welded to the inner wall of the filler neck 60 is the upper end of a metal breather pipe 63 which is intended to compensate for fluctuations in the amount of air and oil held in the lubrication oil tank 30. A semicircular cover plate 64 (FIGS. 7 and 8) is welded to the inner wall of the filler neck 60 at a point above the breather pipe 63. The cover plate 64 is provided with a downward folded portion 65 which prevents lubrication oil from flowing into the breather pipe 63 when the oil is charged into the tank 30. The breather pipe 63 curvedly extends through the main pipe 24 and penetrates the lower wall of the main pipe 24 to be welded thereto. A flexible tube 66 formed of, for example, synthetic rubber is fitted to the lower end of the breather pipe 63 communicates with the internal space of the engine housing 23. In this embodiment, the flexible tube 66 is connected to a metal pipe 68 (FIG. 9) inserted into the cylinder head cover 67 of the engine housing 23 and communicates with a space 69 for holding a valve mechanism, etc. However, the flexible tube 66 may be connected, as shown in the modification of FIG. 10, to a metal pipe 71 inserted into the crank case 70 of the engine housing 23. In this case, the metal pipe 71 communicates with a space 72 for holding a gear shaft, etc.

Lubrication oil is charged from the filler neck 60 into the tank 30 up to a maximum level indicated by Lmax. At this time, lubrication oil is also fully filled into the down tube 26 to expel air remaining in the down tube 26 from its upper opening 26a into the main pipe 24. When the engine starts, lubrication oil is brought into the down tube 26 from the main pipe 24 chiefly through tension pipe 27 and flows down the down tube 26 while being fully cooled by the fins 31. During the descent of lubrication oil through the down tube 26, air bubbles contained in the lubrication oil gather into larger bubbles and rise up the down tube 26 to be carried into the main pipe 24 mainly through the junction opening 26a of the down tube 26 and main pipe 24. On the other hand, lubrication oil is stripped of impurities by the strainer 46 and conducted through the lubrication oil supply tube 49 to those parts of the cam shaft and crank shaft which have to be lubricated. Upon completion of lubrication, lubrication oil is collected in the pan 52 and then returned to the main pipe 24 through the return passageway 53, tube 55 and outlet pipe 59 (FIG. 6). The scavenge pump $P_2$ is generally operated at a larger discharge rate than the feed pump $P_1$, causing a large amount of air to be sucked in. Therefore, hot lubrication oil drawn out of the outlet pipe 59 contains a large amount of air bubbles.

If, therefore, such air-bubble carrying lubrication oil is directly delivered to the junction opening 26a, then the oil will be supplied to the engine in an air-contaminated state, exerting a harmful effect on those parts of the engine which have to be lubricated, particularly when a high load drive demands for circulation of a great deal of lubrication oil. According to this invention, however, the outlet pipe 59 is opened inward of the lubrication oil tank 30, that is, in a direction departing from the junction opening 26a, and lubrication oil discharged through the outlet pipe 59 first enters the main pipe 24 and is carried to the down tube 26 through the tension pipe 27 while being slowly cooled and stripped of air bubbles, thereby eliminating the occurrence of the above-mentioned harmful effect.

While the lubrication system is in operation, lubrication oil and air held in the lubrication oil tank 30 change in amount. In this case, air flows into the main pipe 24 through the breather pipe 63 or conversely air remaining in the main pipe 24 runs out into the breather pipe 63 according to the above-mentioned changed amounts of lubrication oil and air. The lower end of the breather pipe 63 is opened to the internal space of the engine housing 23, preventing dirt and dust from being carried into the lubrication oil tank 30. Further, lubrication oil or vapor thereof escaping from the tank 30 into the breather pipe 63 is brought into the engine housing 23 to be collected in the pan 52.

What we claim is:

1. A lubrication system for motorcycles provided with a lubrication oil tank defined by the internal spaces of the main pipe, down tube and tension pipe constituting the forward half section of a frame unit so as to lubricate the driven parts in an engine housing, wherein the down tube communicates at the upper end with the forward end portion of the main pipe and is provided at the lower end with a lubrication oil supply tube for conducting lubrication oil into the engine housing; and the tension pipe extends obliquely downward to the forward side, and is connected at the upper end to the main pipe behind the junction of the down tube and main pipe and at the lower end to the down tube below said junction.

2. The lubrication system according to claim 1, wherein the upper end of the down tube is fixed to the forward underside of the main pipe.

3. The lubrication system according to claim 2, wherein the main pipe is inclined downward to the rear side; and the tension pipe is connected to the main pipe at such a point that the capacity of the main pipe below a horizontal line including the lowermost part of the junction of the main pipe and tension pipe accounts for less than 5% of the total capacity of the main pipe.

4. The lubrication system according to claim 2, wherein the down tube is provided with a plurality of cooling fins.

5. The lubrication system according to claim 2, which further comprises a lubrication oil return tube for delivering lubrication oil from the engine housing back to the main pipe, said return tube being connected to the main pipe at a point apart from the junction of the main pipe and down tube.

6. The lubrication system according to claim 5, wherein the lubrication oil return tube has an outlet port directed apart from the junction of the main pipe and down tube.

7. The lubrication system according to claim 2, which further comprises a lubrication oil return tube for conducting lubrication oil from the engine housing back to the main pipe, said return tube having an outlet port directed apart from the junction of the main pipe and down tube.

8. The lubrication system according to claim 2, which further comprises a breather pipe, one end of which is opened to the main pipe and the other end of which is opened to the internal space in the engine housing.

9. The lubrication system according to claim 8, wherein the main pipe is provided with a lubrication oil filler neck, and the upper end of the breather pipe is fixed to the inner wall of the filler neck.

10. The lubrication system according to claim 9, wherein the lubrication oil filler neck is provided with a cover plate for preventing lubrication oil from being carried into one end opening of the breather pipe when lubrication oil is charged into the tank.

11. The lubrication system according to claim 8, wherein the engine has a cylinder head cover, and the other end of the breather pipe is fixed to the cylinder head cover.

12. The lubrication system according to claim 8, wherein the engine has a crank case, and the other end of the breather pipe is fixed to the crank case.

13. The lubrication system according to claim 2, wherein the frame unit has brackets welded to the main pipe and down tube and a rear half section of said frame unit which is welded to the brackets after they are fixed in place.

* * * * *